United States Patent
Wang et al.

(10) Patent No.: US 10,778,291 B1
(45) Date of Patent: Sep. 15, 2020

(54) MIMO BOLT-ON DEVICE, MIMO CHANNEL EMULATOR, AND MIMO CHANNEL EMULATION METHOD

(71) Applicant: Intelligent Fusion Technology, Inc, Germantown, MD (US)

(72) Inventors: Zhonghai Wang, Germantown, MD (US); Lun Li, Germantown, MD (US); Jingyang Lu, Germantown, MD (US); Genshe Chen, Germantown, MD (US); Weifeng Su, East Amherst, NY (US); Xingping Lin, Germantown, MD (US); Xingyu Xiang, Germantown, MD (US); Wenhao Xiong, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 0 days.

(21) Appl. No.: 16/358,114

(22) Filed: Mar. 19, 2019

(51) Int. Cl.
*H04B 7/0413* (2017.01)
*H04B 17/391* (2015.01)
*H04B 17/336* (2015.01)

(52) U.S. Cl.
CPC ......... *H04B 7/0413* (2013.01); *H04B 17/336* (2015.01); *H04B 17/3912* (2015.01)

(58) Field of Classification Search
CPC  H04B 17/413; H04B 17/336; H04B 17/3912; H04B 7/0417; H04B 7/0669; H04L 1/0618; H04L 1/06; H04L 25/0204
See application file for complete search history.

(56) References Cited

U.S. PATENT DOCUMENTS

| | | | |
|---|---|---|---|
| 2015/0270882 A1* | 9/2015 | Shattil | H04B 7/0452 370/329 |
| 2016/0054804 A1* | 2/2016 | Gollakata | G06F 3/017 345/156 |
| 2018/0006702 A1* | 1/2018 | Doostnejad | H04B 7/088 |

OTHER PUBLICATIONS

Hu et al. (Practical Implementation of MIMO-FBMC System, Sep. 13, 2018, The International Conference on Communications, Signal Processing, and Systems (CSPS 2018)) (Year: 2018).*
Werth et al. (Wi-Fi Denial of Service Attack on Wired Analog RF Channel Emulator, Oct. 17, 2012, Worcester Polytechnic Institute) (Year: 2012).*

\* cited by examiner

*Primary Examiner* — Ted M Wang
(74) *Attorney, Agent, or Firm* — Anova Law Group, PLLC (57) ABSTRACT

A multiple-input and multiple-output (MIMO) bolt-on device for a single-input and single-output (SISO) radio, a MIMO channel emulator for testing the MIMO bolt-on device, and a MIMO channel emulation method are provided. The MIMO bolt-on device includes: a plurality of antennas, a multi-channel receiver, a plurality of couplers, a micro-controller, and a switch device. The multi-channel receiver includes a plurality of channels for signal transmission. Each coupler is configured to couple the multi-channel receiver with one of the plurality of antennas. The micro-controller is coupled to the multi-channel receiver to compare signals from the plurality of channels, thereby identifying a channel with a highest signal-to-noise (SNR) among the plurality of channels. The switch device is coupled to the micro-controller and configured to select an antenna corresponding to the channel with the highest SNR among the plurality of antennas for a connection between a selected antenna and the SISO radio.

8 Claims, 6 Drawing Sheets

MIMO BOLT-ON DEVICE, MIMO CHANNEL EMULATOR, AND MIMO CHANNEL EMULATION METHOD

GOVERNMENT RIGHTS

This invention was made with Government support under Agreement No. W15QKN-15-9-1004, awarded by the ACC-NJ to the NSC. The U.S. Government has certain rights in this invention.

FIELD OF THE DISCLOSURE

The present disclosure generally relates to the technical field of multiple-input and multiple-output (MIMO) technology and, more particularly, to a MIMO bolt-on device for a single-input and single-output (SISO) radio, a MIMO channel emulator for testing the MIMO bolt-on device, and a MIMO channel emulation method.

BACKGROUND

Radio channel emulators have been used for many years and are essential tools for signal propagation testing to emulate the radio propagation based on pre-defined environmental conditions. Currently, most channel emulators are designed for low spectral-efficient single-input and single-output (SISO) communication system.

To enhance the performance of the wireless radio transmission, the multi-input and multi-output (MIMO) technology has been developed and is widely applied in various wireless applications. In a MIMO communication system, multiple antennas may be both configured at the transmitter and the receiver to improve the transmission reliability and capacity of the wireless communications there between, thus demonstrating high spectral efficiency.

With multiple antennas included in the MIMO bolt-on device, an appropriate antenna selection scheme that selects a desired antenna for transmission at specific moments is needed. A conventional antenna selection scheme is often implemented by monitoring all antenna's input signal strength, and selecting the antenna corresponding to the strongest input signal as a desired antenna for transmission.

However, in a contended environment, the strongest input signal that an antenna corresponds may be a jamming signal. Accordingly, instead of a desired antenna, the conventional antenna selection scheme may select an antenna corresponding to the strongest jamming signal for transmission, which deteriorates the quality of wireless communications between the receiver and the transmitter. Thus, to sustain the benefit of the MIMO communication system in the presence of jamming signals, an improved antenna selection scheme that avoids impact of jamming signals is desired.

Further, given specific transmission environmental conditions, a channel emulator and a channel emulation method that provide corresponding faded representation of a transmitted signal at the receiver need to be developed, to test the performance of the MIMO bolt-on device flexibly and at a relatively low cost.

The disclosed MIMO bolt-on device, MIMO channel emulator, and MIMO channel emulation method are directed to solving one or more problems set forth above and other problems in the art.

BRIEF SUMMARY OF THE DISCLOSURE

One aspect or embodiment of the present disclosure includes a multiple-input and multiple-output (MIMO) bolt-on device for a single-input and single-output (SISO) radio. The MIMO bolt-on device includes a plurality of antennas, a multi-channel receiver, a plurality of couplers, a micro-controller, and a switch device. The multi-channel receiver includes a plurality of channels for signal transmission. Each coupler is configured to couple the multi-channel receiver with one of the plurality of antennas. The micro-controller is coupled to the multi-channel receiver to compare signals from the plurality of channels, thereby identifying a channel with a highest signal-to-noise (SNR) among the plurality of channels. The switch device is coupled to the micro-controller and configured to select an antenna corresponding to the channel with the highest SNR among the plurality of antennas for a connection between a selected antenna and the SISO radio.

One aspect or embodiment of the present disclosure includes a MIMO channel emulator for testing a MIMO bolt-on device, including a universal software radio peripheral (USRP) device, a power divider, a plurality of controllable attenuators, and a multi-channel USRP device. The universal software radio peripheral (USRP) device is configured to generate signals. The power divider is configured to separate the signals generated by the USRP device. The plurality of controllable attenuators serve as a plurality of channels for the signals separated by the power divider to traverse. The multi-channel USRP device serves as a receiver to compare the signals traversing the plurality of channels and to identify a channel with a highest SNR.

One aspect or embodiment of the present disclosure includes a MIMO channel emulation method, including: feeding output control files into a plurality of controllable attenuators, where a controllable attenuator emulates a channel for signal transmission; outputting, by the plurality of controllable attenuators, signals to a receiver, where the receiver is coupled to a processor; and estimating, by the processor, SNRs of the signals output by the plurality of controllable attenuators to identify a channel with a highest SNR.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Various embodiments applied to describe principles of the present disclosure are for illustrative purposes and shall not be construed as limiting of the scope of the present disclosure. With reference to the accompanying drawings, the following descriptions are used to fully understand various embodiments defined by the claims and their equivalents of the present disclosure, and wherever possible, the same reference numbers will be used throughout the drawings to refer to the same or like parts. Such descriptions include various specific details to aid understanding, and these details shall be considered as for illustrative purposes only.

Thus, those ordinarily skilled in the relevant art shall understand that, without departing from the scope and spirit of the present disclosure, various modifications and alterations may be made to the disclosed embodiments. Further, for clarification and conciseness, descriptions of well-known functions and structures are omitted. Throughout the accompanying drawings, the same or like reference numerals refer to the same or like structures, functions or operations.

In the accompanying drawings, some block diagrams and/or flow charts are illustrated. It should be understood that some blocks or combination thereof in the block diagrams and/or flow charts may be implemented by computer program instructions. These computer program instructions may be provided to one or more processors of general-purpose computers, specialized computers, or other programmable data processing devices, such that when being executed by the one or more processors, such instructions may establish devices for realizing functions/operations illustrated in the block diagrams and/or flow charts.

The present disclosure provides a multiple-input and multiple-output (MIMO) bolt-on device, a channel emulator for testing the MIMO bolt-on device, and a channel emulation method. As disclosed, an exemplary MIMO bolt-on device for single-input and single-output (SISO) radio, including multiple antennas, is developed to convert a single radio into a receiver or transmitter having multiple antennas, thus enabling the upgrade of a SISO communication system into a MIMO communication system. For example, the SISO communication system may include a transmitter and a receiver connected through a single channel. Such MIMO bolt-on device may instantaneously improve the legacy SISO communication system in terms of transmission range and quality at a very low cost.

Figure 1:
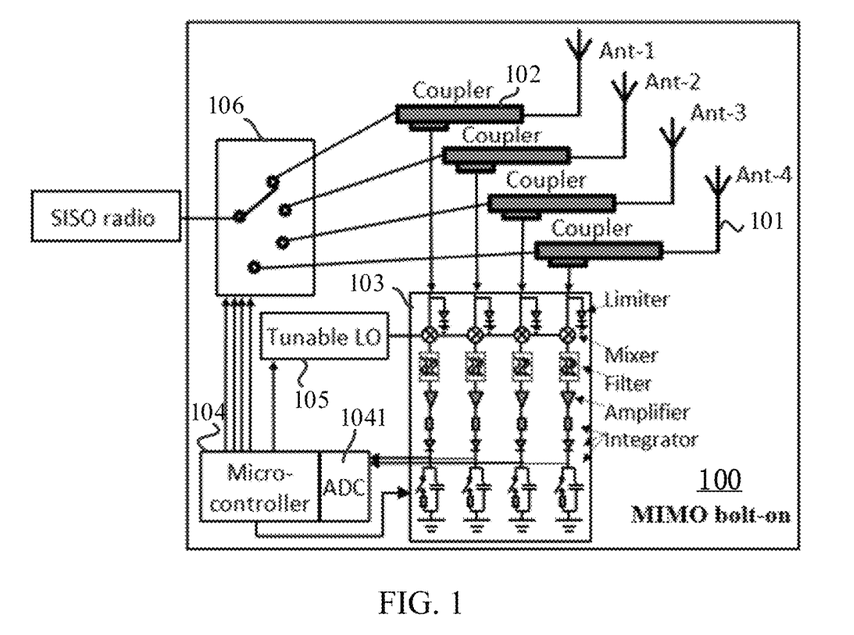
FIG. 1 illustrates a schematic view of an exemplary MIMO bolt-on device including four antennas according to some embodiments of the present disclosure.

FIG. 1 illustrates a schematic view of an exemplary MIMO bolt-on device 100 for a SISO radio according to various embodiments of the present disclosure.

As shown in FIG. 1, the MIMO bolt-on device 100 may be coupled to a SISO communication system or a SISO radio, and may include a plurality of antennas, such as four antennas 101 (e.g., Ant-1, Ant-2, Ant-3, and Ant-4), a plurality of couplers 102, a multi-channel receiver 103, a micro-controller 104, a tunable local oscillator (LO) 105, and a switch device 106. Optionally, the multi-channel receiver 103 may include a plurality of limiters, a plurality of mixers, a plurality of filters, a plurality of amplifiers, and a plurality of integrators. The micro-controller 104 may include an analog-to-digital converter (ADC) 1041. The switch device 106 may include a plurality of switches.

In some embodiments, the MIMO bolt-on device 100 may include a different number of antennas 101. That is, the present disclosure is not intended to limit the number of antennas 101, e.g., more or less than four antennas may be included in the MIMO bolt-on device 100. For example, the MIMO bolt-on device 100 may include a number N of antennas 101, where N is a positive integer. Under this situation, the MIMO bolt-on device 100 may include a number N of couplers 102, corresponding to the number N of couplers 102, and the number of N antennas 101.

Each antenna 101 is configured to transmit or receive a signal (e.g., analog signal), and each antenna 101 may be coupled to one coupler 102. One coupler 102 is disposed in a path for coupling a part of the transmitted or received signal. Further, each coupler 102 may be coupled to the multi-channel receiver 103, and the multi-channel receiver 103 may be coupled to the tunable LO 105. The multi-channel receiver 103 may be, for example, a four-channel analog receiver, corresponding to the exemplary four antennas 101 as shown in FIG. 1, according to one embodiment of the present disclosure.

In some embodiments, the multi-channel receiver 103 may include a plurality of limiters, a plurality of mixers, a plurality of filters, a plurality of amplifiers, and a plurality of integrators, forming a plurality of signal channels. For example, when being a four-channel analog receiver, the multi-channel receiver 103 includes four limiters, four mixers, four filters, four amplifiers, and four integrators, together forming four signal channels. A mixer may be configured to convert (e.g., translate) a frequency of a signal to an intermediate frequency.

A limiter may be disposed before each mixer to reduce strong incoming jamming signals, and a filter may be disposed after each mixer and before a corresponding amplifier to filter the signal. Further, an integrator may be coupled to each amplifier and configured to sample signals from the amplifier.

Further, the multi-channel receiver 103 may be coupled to the micro-controller 104. The micro-controller 104 may be configured to calculate transmitting signal frequency so as to allow the multi-channel receiver 103 to capture signals within certain frequency range(s). Further, the micro-controller 104 may compare signals received from the plurality of signal channels in the multi-channel receiver 103, obtain a signal comparison result, and select a desired antenna based on the signal comparison result.

The micro-controller 104 may be coupled to the tunable LO 105, and realize control of the tunable LO 105. For example, the micro-controller 104 may adjust the tunable LO 105 to make the multi-channel receiver 103 to work at a desired frequency. Further, the micro-controller 104 may be coupled to the switch device 106, and realize control of the switch device 106. For example, after obtaining the aforementioned signal comparison result, the micro-controller 104 may control the switch device 106 to switch on a desired switch, thereby selecting a desired antenna.

Further, as described above, the micro-controller 104 may include an ADC 1041. The ADC 1041 may convert the signals sampled by the integrators into digital signals, thus allowing the micro-controller 104 to compare signals from different signal channels in the digital format and to identify a desired signal channel, for further selection of a desired antenna.

The conventional approach for channel/antenna selection is to select a desired channel by sensing the input signal strength, which cannot sustain its benefit in the presence of jamming signals, since the receiver may pick up the channel with the largest jamming signal power. To address such issue, a SNR estimation-based antenna selection scheme is provided to ensure that a desired channel is selected and further utilized by estimating the SNR for received signals even in an environment with jamming signals.

In the disclosed SNR estimation-based antenna selection scheme, SNR is estimated for different signal channels, and a signal channel with the highest estimated SNR may be selected, e.g., by the micro-controller 104, as the desired signal channel. After determination of the signal channel with the highest SNR, the micro-controller 104 may enable the switch device 106 to select an antenna to which the channel with the highest SNR corresponds. For example, after identifying the channel with the highest SNR, the micro-controller 104 may control the switch device 106 to switch on a switch corresponding to the channel with the highest SNR and to switch off the rest switches, thereby establishing a connection between the SISO radio and the selected antenna.

Further, the SNR may be estimated through various algorithms, such as the data-aided (DA) SNR estimation algorithms and the non-data-aided (NDA) estimation algorithms. In a (DA) SNR estimation algorithm, special pilot symbols or training sequences need to be previously known to the receiver and be inserted into the transmitted signal, which reduces the system throughput. In an NDA SNR estimation algorithm, the transmitted signal is assumed to remain unknown to the receiver and, due to the elimination of pilot symbols and training sequences, the NDA SNR estimation algorithm provides satisfying bandwidth efficiency.

The second order moment and fourth order moment (M2M4) SNR estimation algorithm ("M2M4 SNR estimation algorithm") is known as an NDA SNR estimation algorithm. Because of its relatively low computational complexity and taking into considerations the practical bolt-on restriction, the M2M4 SNR estimation algorithm may be applied to estimate the SNR of different channels, thereby facilitating more accurate antenna selection. The moment-based M2M4 SNR estimation algorithm estimates SNR through the second order and fourth order moments of the received signal.

In some embodiments, for the SNR estimation-based antenna selection scheme, the performance of the M2M4 SNR estimation algorithm is tested by using the M-ary phase shift keying (MPSK) signal corrupted by the additive white Gaussian noise (AWGN). In other words, some embodiments of the present disclosure provide an SNR estimation-based antenna selection scheme using M2M4 SNR estimation algorithm for MPSK modulation over AWGN channels. Optionally, other types of modulation over other types of channels can also be applied based on practical demands.

MPSK is a digital communication approach in which the phase of a transmitted signal is varied to convey information, and is widely applied due to its relatively high data transmission rate. Further, AWGN is a generally accepted model for the net effect of noise at the receiver of a communication system, which assumes that the received signal equals the transmitted signal plus noise statistically independent of the transmitted signal and that the noise samples have a Gaussian distribution.

For an AWGN channel, assume there are L symbols (also referred to as "L messages") transmitted over the AWGN channel in one transmitting frame, then an incoming signal (also referred to as "received signal") of a $l^{th}$ symbol may be expressed as:

$$y_l = \sqrt{S}x_l + \sqrt{N}n_l \quad (1)$$

where S is the signal power, N is the noise power, $x_l$ represents a MPSK transmitted signal, $n_l$ represents an AWGN noise sample, and l is the symbol index. In particular, the range of l is $1 \leq l \leq L$, where L denotes a transmitting frame size, i.e., the number of symbols in each frame.

In equation (1), the received signal is the sum of two components. The first component $\sqrt{S}x_l$ is the transmitted signal term that would be obtained in the absence of noise, and the second component $\sqrt{N}x_l$ is the noise term (also referred to as "AWGN term" hereinafter) whose quantity is random but can be assumed to be drawn from a Gaussian probability distribution with mean 0 and certain variance. Further, the second component is independent of the first component.

Note that the second component of the equation (1), i.e., the AWGN term ($\sqrt{N}x_l$), may include the Gaussian jamming signal. Further, the second and fourth order moments of $y_l$ can be mathematically formulated by S and N. In practice, the second and fourth order moments are estimated by their averages of the $2^{nd}$ and $4^{th}$ norms of signals respectively. Therefore, S and N can be solved as two unknowns in two linear equations, and because SNR in a digital communication system is defined as the ratio of the signal power to the noise power, the estimated SNR may be expressed as $$\rho = \frac{\hat{S}}{\hat{N}}.$$

Further, the relationship between the symbol-error-rate (SER) and the SNR may be plotted. The SER represents the probability of receiving a symbol in error, and may be approximated by comparing the number of symbols received in error to the total number of transmitted symbols. Thus, the SER may function as a performance indication of a wireless communication system.

Figure 4:
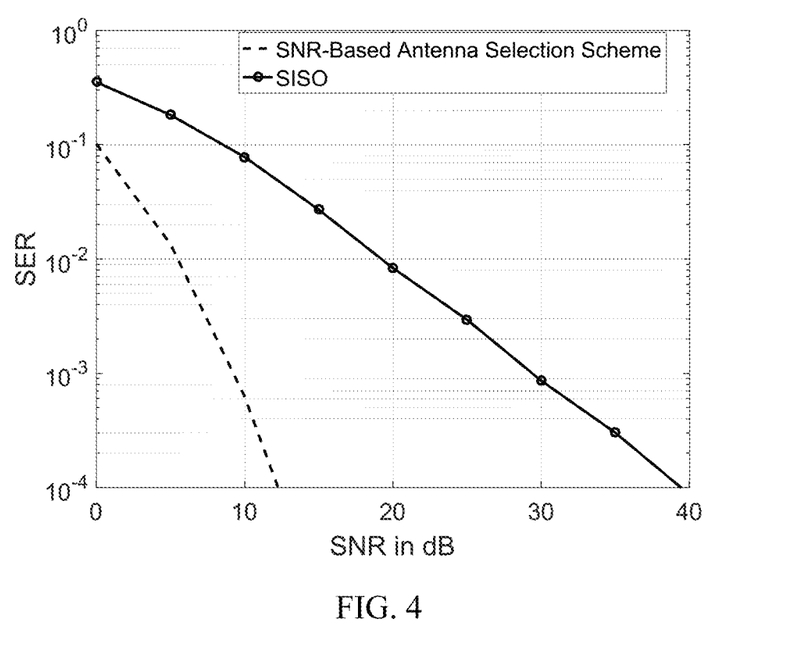
FIG. 4 illustrates symbol error rate (SER) performance of a MIMO bolt-on device using an exemplary SNR estimation-based antenna selection scheme with respect to SER performance of a conventional SISO radio according to some embodiments of the present disclosure.
Figure 5A:
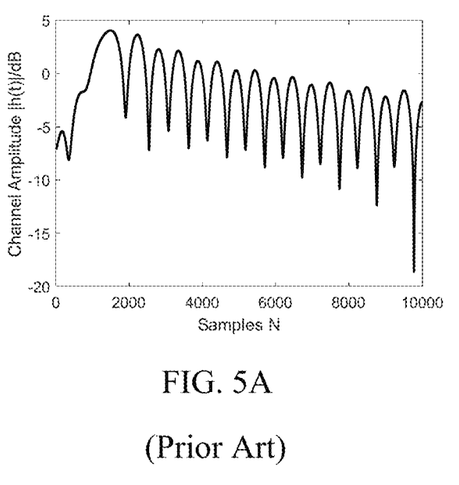
FIGS. 5A-5D illustrate existing simulation results for four fading channels based on the Jake's fading model according to some embodiments of the present disclosure.
Figure 5B:
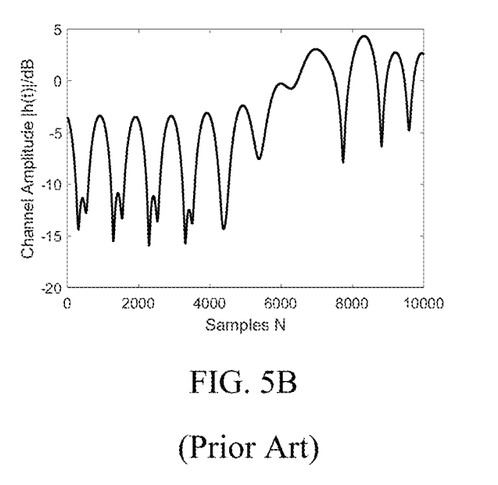
Figure 5C:
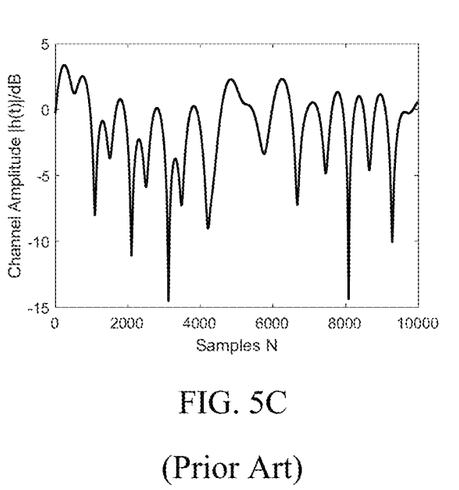
Figure 5D:
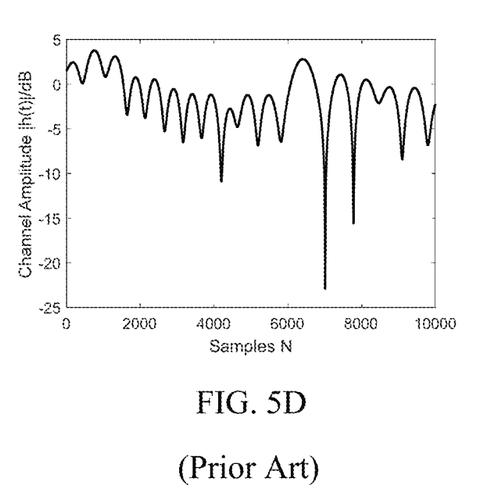
Figure 6A:
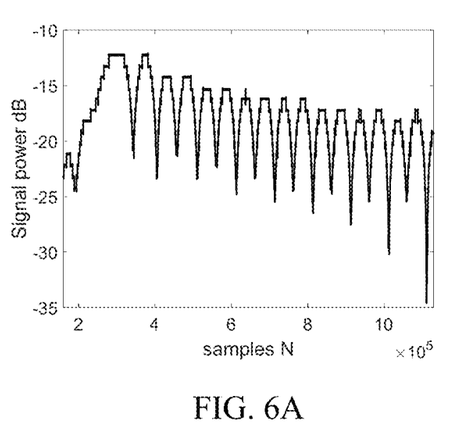
FIGS. 6A-6D illustrate emulation results produced by an exemplary MIMO channel emulator based on simulation results in FIGS. 5A-5D according to some embodiments of the present disclosure.
Figure 6B:
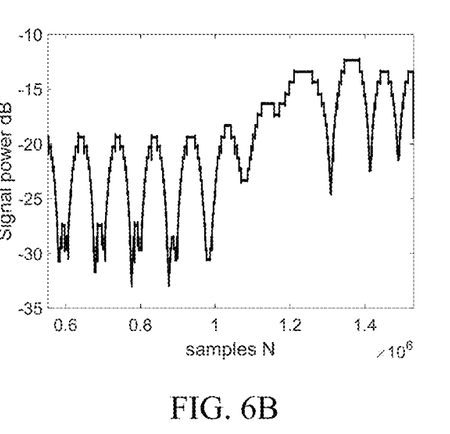
Figure 6C:
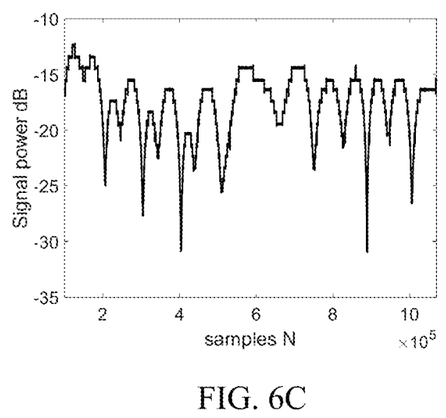
Figure 6D:
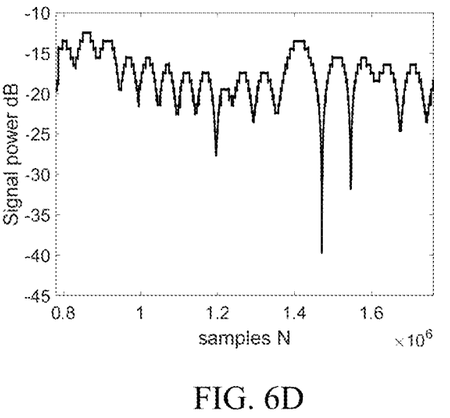

For example, FIG. 4 plots the SER-SNR relationship for the aforementioned MIMO bolt-on device using an SNR-estimation based antenna selection scheme and the SER-SNR relationship for a conventional SISO radio, both in the presence of Gaussian jamming signals. Quadrature Phase Shift Keying (QPSK) signals are simulated for both devices. As shown in FIG. 4, the MIMO bolt-on device adopting the disclosed SNR-based antenna selection scheme outperforms the SISO radio by demonstrating a significant SNR gain. Accordingly, it is indicated that the MIMO bolt-on device may be applied to improve the performance of the SISO radio.

That is, for a given desired SER, the MIMO bolt-on device using the disclosed SNR-based antenna selection scheme may require less SNR. In other words, the SISO radio shows higher power requirement to achieve a desirable SER. The reason of such significant SNR gain for the MIMO bolt-on device may be due to the configuration of the disclosed SNR-based antenna selection scheme to sense the SNRs of the signals at each antenna in a contended environment. Further, by including multiple antennas, the MIMO bolt-on device brings diversity gain to the SISO radio, which may prevent the occurrence of poor signal performance of the SISO radio caused by phenomenon such as deep fading. Accordingly, the disclosed MIMO bolt-on device instantaneously improves the legacy SISO radio in terms of transmission range and quality.

As such, the micro-controller 104 can calculate the transmitting signal frequency, and further determine the working frequency of multi-channel receiver 103. It is noted that the transmitting signal frequency and the working frequency of the multi-channel receiver 103 does not necessarily to be the same, but need to be paired up for signal transmission. After frequency determination, the micro-controller 104 may adjust the tunable local oscillator (LO) to make the multi-channel receiver 103 to work at that desired frequency. The multi-channel receiver 103 (or more specifically, the mixers included in the multi-channel receiver) converts the received signal to into a signal with an intermediate frequency (IF), where the signal is further sampled with an integrator (its integration time can be controlled with a switch). Further, the sampled signal levels of the four channels are converted to digital formats through the ADC 1041 of the microcontroller 104. In the micro-controller 104, the four channels are compared, and the channel with the largest SNR will be switched on at the next switchable time (either triggered by the synchronization signal or after a long enough delay from the last switch time). In one embodiment, the microcontroller 104 is configured to calculate and compare SNR among the channels 101 and switch to the channel with the largest SNR.

Accordingly, the disclosed MIMO bolt-on device instantaneously improves the legacy SISO radio in terms of transmission range and quality. The cost of the MIMO bolt-on device may be relatively low by relying on basic electronic components such as limiters, filters, etc., and the device is such designed that it can easily bolt on a SISO device and be upgraded effortlessly. Further, using a SNR-estimation based antenna selection scheme, the MIMO bolt-on device may realize an anti-jamming capability by estimating and comparing SNR of signals from different signal channels, thereby improving the accuracy of selecting a desired antenna.

The present disclosure further provides a MIMO channel emulator for testing a MIMO bolt-on device. For example, the MIMO channel emulator may include a configurable software-predefined channel fading attenuation system (e.g., for emulating the fading channels using software predefined files), and a signal-to-noise ratio (SNR) estimation-based antenna selection scheme.

Figure 2:
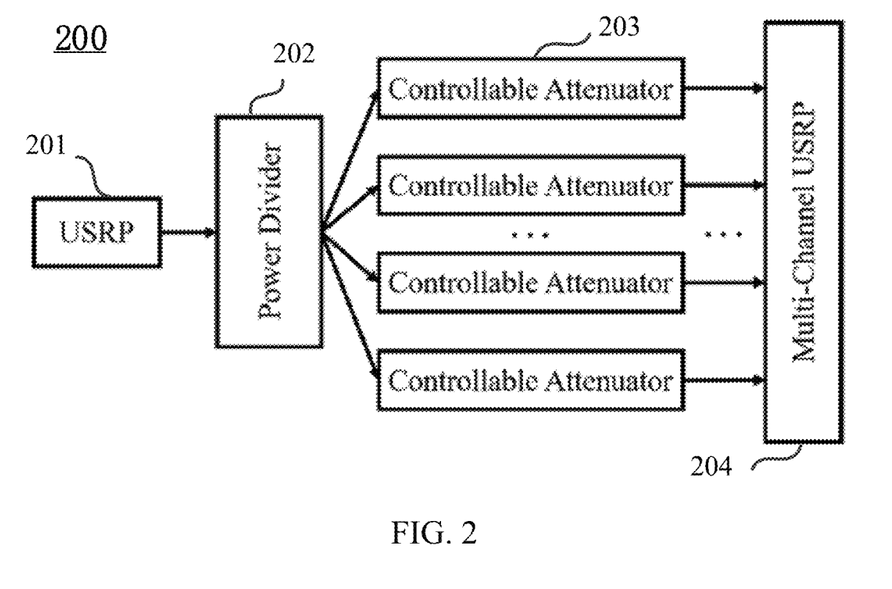
FIG. 2 illustrates a schematic view of an exemplary MIMO channel emulator including a USRP device, a power divider, multiple attenuators, and a multi-channel USRP device according to some embodiments of the present disclosure.

For example, FIG. 2 illustrates a schematic view of an exemplary structure of a MIMO channel emulator 200. As shown in FIG. 2, the MIMO channel emulator 200 includes a universal software radio peripheral (USRP) device 201, a power divider 202, a plurality of controllable attenuator 203, and a multi-channel USRP device 204 (e.g., which corresponds to an exemplary MIMO bolt-on device). Optionally, the MIMO channel emulator 200 may further include a configurable channel simulator.

The USRP device 201 is configured to generate software-defined signals. The power divider 202 is used to separate these signals and feed the separated signals to the plurality of controllable attenuators 203. The controllable attenuators 203 serve as a plurality of channels for the separated signals to traverse and may be controlled based on a propagation model. For example, given a specified propagation model, the configurable channel simulator may be applied to generate an output control file including related parameters of the specified propagation model, and the output control file may be fed into the controllable attenuators 203 to emulate different channel conditions.

The multi-channel USRP device 204 serves as the receiver to receive the signal from each channel. Further, the multi-channel USRP device 204 may be coupled to a computing device to compute the SNR for signals received from each channel, thereby identifying the channel with the highest SNR for further selection of a desired antenna.

Further, depending on specific requirements, different propagation models may be applied to configure the controllable attenuators 203. Examples of the propagation models for configuring the controllable attenuators 203 are described later in this specification for illustrative purposes.

In a wireless communication system, the presence of scattering objects or reflectors in the environment surrounding a transmitter and a receiver may create multiple paths for a transmitted signal to traverse. Thus, a transmitted signal may experience multipath propagation that causes rapid signal level fluctuations in time, called fading. In other words, fading is caused by interference between two or more versions of the transmitted signal arriving at the receiver at slight different time, where the two or more versions of the transmitted signal traverse different paths. A fading channel refers to a channel that experiences fading.

Further, there are many other parameters or conditions that need to take into consideration when building or selecting the propagation model, such as the fading degree and the well-known Doppler effect. For example, the motion of the receiver with respect to a stationary transmitter (e.g., a transmitting antenna) may cause Doppler shift. Doppler shift is the change in frequency or wavelength of signal radio caused by the variation of the corresponding channels. A significant Doppler shift indicates that the corresponding channel connecting the receiver to the transmitter is not very stable.

Based on application scenarios, different propagation models may be used. For example, Rician fading model is adopted for airborne line-of-sight (LOS) communications, while Rayleigh fading model is adopted for heavily built-up city non line-of-sight (NLOS) wireless communications. Thus, to accurately and flexibly emulate MIMO fading channels under various application scenarios, the channel simulator need to be easily configurable.

In some embodiments, as a simplified approach of the Rayleigh fading model that primarily deals with small-scale fading, Jake's fading model is applied as the propagation model to simulate signal propagation. For example, based on the Jake's fading model, a channel simulator may generate a corresponding output control file. Given input signals and based on the output control file, the controllable attenuators 203 may emulate the propagation of the input signals from a transmitter to a receiver.

Specifically, the Jake's fading model describes a channel in an environment with many scattering objects and no direct line of sight between the transmitter and the receiver. More specifically, in the Jake's fading model, there are a ring of isotropic scattering objects around the receiver, and multiple paths arrive at the receiver from different directions and with different Doppler shifts. In other words, there are a range of Doppler frequency shifts due to the existence of multiple paths that the transmitted signal traverses, which form the Doppler spectrum. The maximum Doppler frequency shift occurs, for example, when the receiver is moving either straight to or straight from the transmitter.

Further, in the Jake's fading model, because the receiver moves, the movement of the receiver causes the channel coefficient to be correlated with time (e.g., the amplitude of the signal transmitted in the channel varies in time), and the Jake's fading model models instantaneous channel coefficient at moment t. Further, the shift in the frequency of the signal arrived at the receiver with respect to the frequency of the signal sent from the transmitter may be referred to as "Doppler frequency", and is denoted by $f_D$. In the Jake's fading model, the Doppler frequency $f_D$ may be expressed as:

$$f_D = \frac{v}{\lambda}\cos\theta = f_{D,max}\cos\theta \quad (2)$$

where $\lambda$ denotes the wavelength of the arrived signal, v denotes the relative velocity between transmitter and receiver, and $\theta$ is the arrival angle of the signal relative to the moving direction of the receiver.

According to equation (2), the maximum Doppler frequency is written as $$f_{D,max} = \frac{v}{\lambda}.$$

Further, given the symbol duration $T_s=1/BW$, where the BW denotes the bandwidth of the transmitted signals, the normalized maximum Doppler frequency $f_{D,max}T_s$ can be calculated as:

$$f_{D,max}T_s = \frac{1}{BW}f_{D,max} = \frac{v}{BW\lambda} \quad (3)$$

In equation (3), $f_{D,max}T_s$ is also referred to as "fading rate" or "fading degree", and the greater the fading rate $f_{D,max}T_s$, the faster the fading of the corresponding channel. Further, fast fading of a channel means that the channel changes every few symbols.

For a different propagation model, a channel simulator may generate a different output control file including parameters for configuration of corresponding channel conditions, such that the controllable attenuators 203 can be controlled correspondingly. All such parameters that determine the channel conditions can be flexibly configured in the channel simulator.

Further, the software-defined signals passing through the channels (i.e., controllable attenuators 203) may be sent to the multi-channel USRP device 204, and be further transmitted to a computing device to which the multi-channel USRP device 204 couples. The computing device may estimate the SNR for the signals, and select the channel with the highest SNR. Further, the antenna corresponding to the channel with the highest SNR may be selected as a desired antenna.

Figure 3:
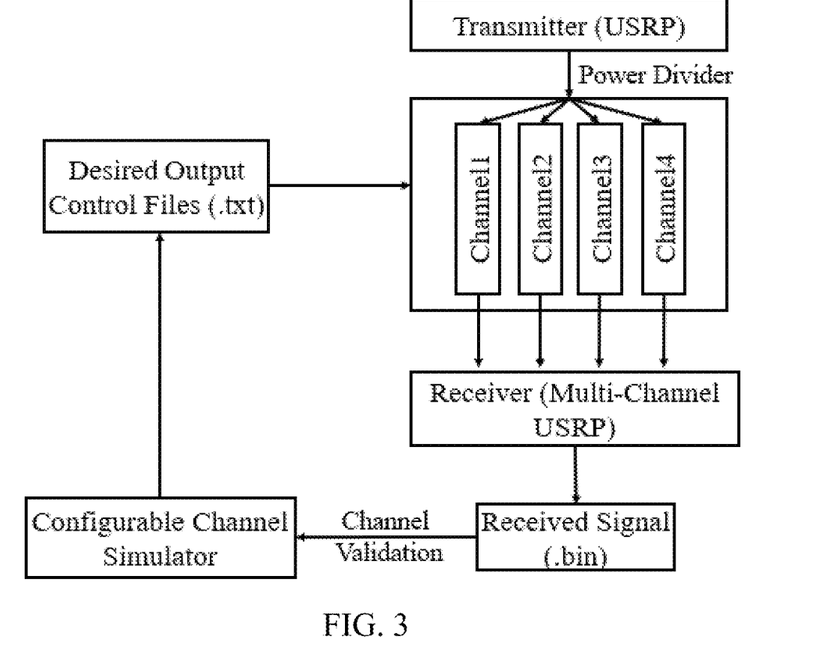
FIG. 3 illustrates a flow chart showing working principles of an exemplary MIMO channel emulator according to some embodiments of the present disclosure.

FIG. 3 illustrates a flow chart showing working principles of channels in an exemplary MIMO channel emulator (e.g., four-channel emulator) according to embodiments of the present disclosure. Referring to FIG. 3, a transmitter (e.g., a USRP device) may generate an input signal, and through a power divider, the input signal may be divided and respectively transmitted to four controllable attenuators that server as four channels (channel1, channel2, channel3, and channel4). A configurable channel simulator may be configured to generate a desired output control file (.txt) based on a selected propagation model, where simulated channel parameters are saved in the desired output control files (.txt) and are fed into channel1, channel2, channel3, and channel4. The four channels output signals, and the corresponding output signals are received by a receiver. The receiver may be the disclosed multi-channel USRP device.

Further, the power values of received signals are saved in a receive signal power file (.bin file), which serves as the feedback to the configurable channel simulator to further validate the emulation accuracy. For example, based on the selected propagation model, the configurable channel simulator may be further configured to produce and save a simulate result in a pre-simulated file, and, the emulation result saved in the receive signal power file (.bin) may be read in the configurable channel simulator to compare with the simulation result in the pre-simulated file, thereby validating the emulation accuracy.

An example of the emulation accuracy validation is provided with reference to FIGS. 5A-5D and FIGS. 6A-6D. For example, FIGS. 5A-5D plot the channel amplitude (also referred to as "power of faded signal") as a function of the sample size for four channels simulated using the Jake's fading simulation model. In FIGS. 5A-5D, 10,000 samples are used, the value of $f_{D,max}T_s$ is set to be 0.001, and orthogonal functions (Walsh-Hadamard codewords) are applied to reduce the cross-correlation between different channels to better simulate the independent MIMO channels. As shown in FIGS. 5A-5D, when the signal passes through each channel, phase of the signal is shifted. It is noted that, deep fading may be found in certain channels, which may cause weak signal or even outage.

FIGS. 6A-6D show the channel emulation results generated by the disclosed MIMO channel emulator using the output results of simulated channels in FIGS. 5A-5D. The consistency between the results for emulated channels in FIGS. 6A-6D and the results for simulated channels in FIGS. 5A-5D is established, thereby validating the emulation accuracy and the effectiveness of the disclosed MIMO channel emulator. Optionally, the resolution of emulated channels can be improved by applying controllable attenuators with higher accuracy.

Further, an antenna selection scheme, such as the above-described SNR-based antenna selection scheme, may be applied by the computing device coupled to the receiver, to implement antenna selection. Referring to FIG. 2, the multi-channel USRP device 204 may be applied to capture the signals, and transmit the captured signals to a computing device (not shown) that is coupled to the multi-channel USRP device 204. The computing device may include at least a processor, and/or a memory. Further, signals captured from the four channels may be processed and compared by the at least one processor of the computing device. For example, based on the SNR-estimation antenna scheme, the at least one processor may estimate the SNR for each signal captured from the four channels and select the signal with the highest SNR for further selection of a desired antenna.

In some embodiments, the computing device may include a M2M4 SNR estimation module created by using a software development toolkit such as a GNU Radio. Based on the M2M4 SNR estimation module, the SNR estimation-based antenna selection scheme may be implemented, to select a desired antenna to which a signal with highest SNR corresponds.

Figure 7A:
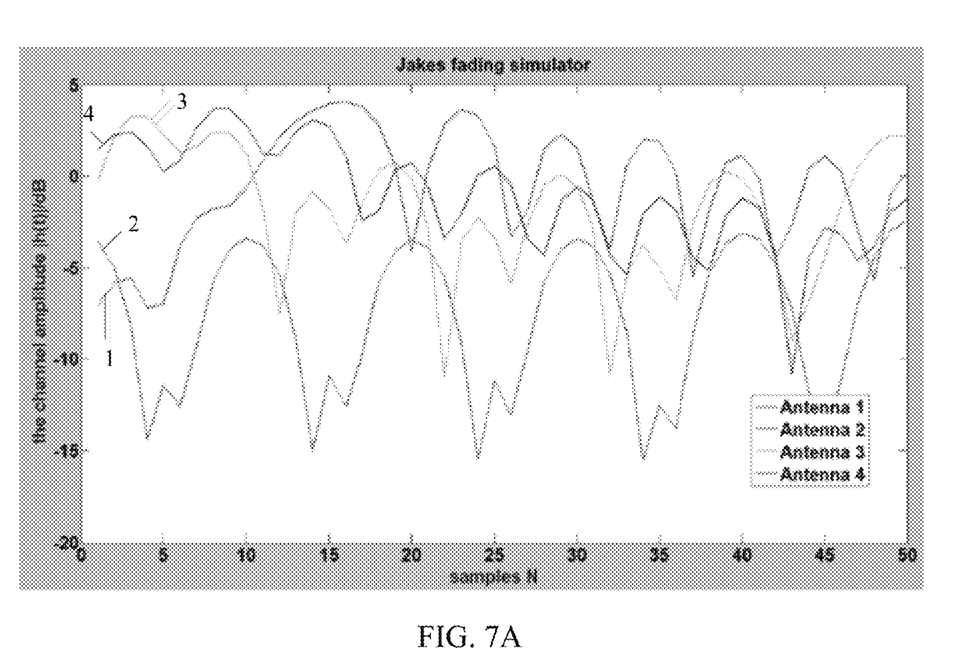
FIG. 7A illustrates simulation results for four channels based on FIG. 5, obtained with reduced sample number according to some embodiments of the present disclosure.
Figure 7B:
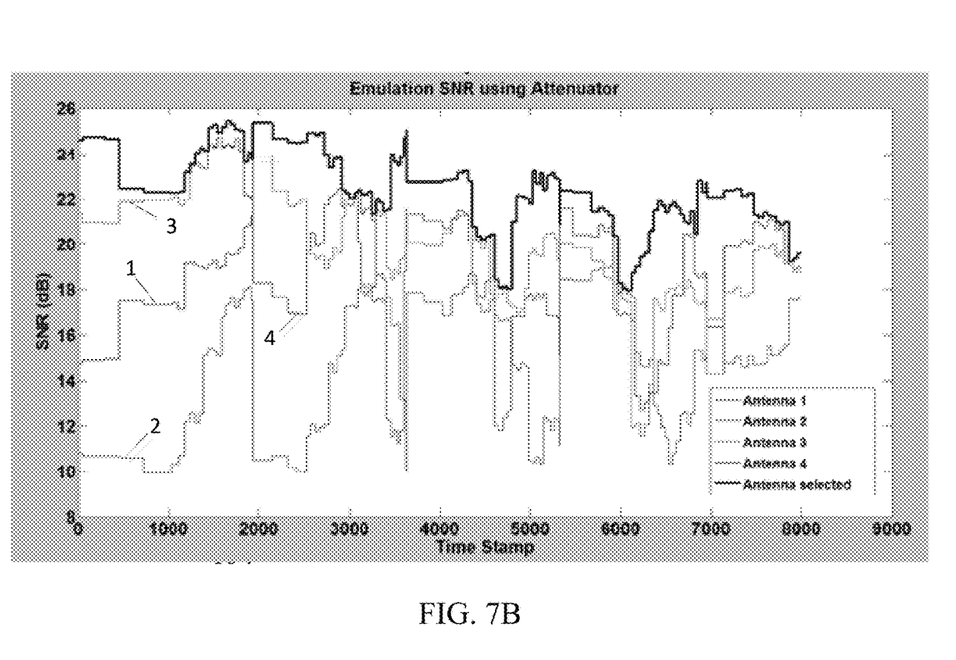
FIG. 7B illustrates a result of channel selection by applying an SNR estimation-based antenna selection scheme to emulation results obtained based on the simulation results in FIG. 7A and take into consideration noise signals according to some embodiments of the present disclosure.

FIG. 7A illustrates simulation results for four channels generated by a channel simulator based on Jake's fading model. FIG. 7B illustrates emulation results for four channels obtained based on the simulation results in FIG. 7A and take into consideration the noise. As shown in FIG. 7A, a relatively small number of samples may be applied to reduce the emulation time of the disclosed MIMO channel emulator to obtain corresponding emulation results, and the four channels may correspond to antenna 1, antenna 2, antenna 3, and antenna 4.

Referring to FIG. 7B, the four channels similarly correspond to antenna 1, antenna 2, antenna 3, and antenna 4, and a black thick line is highlighted to indicate selected antenna over timestamp by applying an SNR estimation-based antenna selection scheme to the emulation results obtained based on FIG. 7A. Further, at each timestamp, a SNR estimation-based antenna selection scheme may be applied, for example, the channel showing the highest SNR may be selected as the desired channel. Thus, different channels (antennas) corresponding to the highest SNR may be selected at different timestamps. Accordingly, issues such as deep fading may be avoided, and the accuracy of antenna selection may be improved.

As such, a MIMO channel emulator is provided to accommodate the MIMO technology. For example, the MIMO channel emulator may be applied to test the aforementioned MIMO bolt-on device, at a relatively low cost. Based on different application scenarios, the controllable attenuators of the MIMO channel emulator may be flexibly controlled using different propagation models. Further, the signals received by a receiver (e.g., the multi-channel USRP device) may be processed by a computing device coupled to the receiver, and the SNR for these signals may be estimated and compared based on a SNR-estimation based antenna selection scheme. Accordingly, the accuracy of selecting a desired antenna may be improved.

Figure 8:
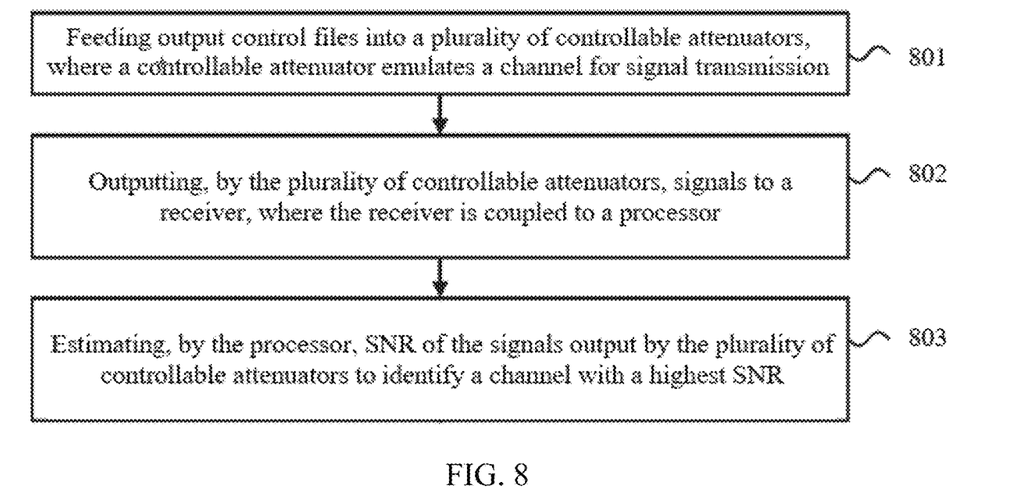
FIG. 8 illustrates a flow chart of a MIMO channel emulation method according to some embodiments of the present disclosure.

The present disclosure further provides a MIMO channel emulation method. For example, FIG. 8 illustrates a flow chart of a MIMO channel emulation method for a MIMO bolt-on device according to some embodiments of the present disclosure. As shown in FIG. 8, the MIMO channel emulation method may include following steps.

S801: feeding output control files into a plurality of controllable attenuators, where a controllable attenuator emulates a channel for signal transmission.

S802: outputting, by the plurality of controllable attenuators, signals to a receiver, where the receiver is coupled to a processor.

S803: estimating, by the processor, SNRs of the signals output by the plurality of controllable attenuators to identify a channel with a highest SNR.

In some embodiments, before the feeding output control files into a plurality of controllable attenuators, the method may further include; generating, by a channel simulator, output control files based on a selected propagation model. Further, the output control files may include parameters of the selected propagation model to control the plurality of controllable attenuators.

In some embodiments, the aforementioned channel simulator may be further configured to, based on the selected propagation model, produce and save simulation results in pre-simulated files. Correspondingly, the disclosed method further includes saving power values of the signals output by the plurality of controllable attenuators into receive signal power files and comparing the pre-simulated files and the receive signal power files for validating emulation.

In some embodiments, the propagation model may be the Jake's fading model, and the output control files may include parameters of the Jake's fading model. Further, when a propagation model different from the Jake's fading model is applied, the channel simulator may generate different output control files to control the plurality of controllable attenuators correspondingly, thereby accurately emulating signal transmission over channels under different application scenarios. That is, the plurality of controllable attenuators may be flexibly configured to emulate channels under different conditions.

In some embodiments, by the processor, SNRs of the signals output by the plurality of controllable attenuators to identify a channel with a highest SNR further include estimating, by the processor, the SNRs of the signals output by the plurality of controllable attenuators using a SNR-estimation based antenna selection scheme, and identifying the channel with a highest estimated SNR. The SNR-estimation based antenna selection scheme may include, for example, a M2M4 SNR estimation algorithm, which is relatively low computational complexity and takes into considerations the practical bolt-on restriction. Such M2M4 SNR estimation algorithm may facilitate more accurate antenna selection.

As such, a MIMO channel emulation method, including an antenna selection scheme, is provided to flexibly emulate channels under different application scenarios. Further, by using a SNR-estimation based antenna selection scheme to the MIMO bolt-on device, the MIMO channel emulation method may demonstrate an anti-jamming capability by estimating and comparing SNR of signals from different channels, thereby improving the accuracy of selecting a desired antenna.

Further, other aspects of the MIMO channel emulation method may find corresponding descriptions in the aforementioned illustration of MIMO bolt-on device and MIMO channel emulator, and repeated descriptions are not provided in this specification.

The aforementioned illustrations of the disclosed embodiments teach those skilled in the relevant art to implement or employ the present disclosure. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A multiple-input and multiple-output (MIMO) channel emulator for testing a MIMO bolt-on device, comprising:
   a universal software radio peripheral (USRP) device, configured to generate signals;
   a power divider, configured to separate the signals generated by the USRP device;
   a plurality of controllable attenuators, serving as a plurality of channels for the signals separated by the power divider to traverse; and
   a multi-channel USRP device, serving as a receiver to compare the signals traversing the plurality of channels and to identify a channel with a highest signal-to-noise (SNR), wherein:
   the multi-channel USRP device couples to a processor to identify the channel with the highest SNR by using a second order moment and a fourth order moment (M2M4) SNR estimation algorithm.

2. The emulator according to claim 1, further including:
a channel simulator, configured to generate an output control file based on a propagation model, wherein the output control file includes parameters of the propagation model to control the plurality of controllable attenuators.

3. The emulator according to claim 2, wherein:
for different propagation models, the channel simulator generates different output control files to control the plurality of controllable attenuators.

4. A multiple-input and multiple-output (MIMO) channel emulation method, comprising:
generating, by a channel simulator, output control files based on a propagation model, wherein the output control files include parameters of the propagation model to control a plurality of controllable attenuators;
feeding the output control files into the plurality of controllable attenuators, wherein a controllable attenuator emulates a channel for signal transmission;
outputting, by the plurality of controllable attenuators, and
estimating, by a processor, signal-to-noise (SNRs) of the signals output by the plurality of controllable attenuators to identify a channel with a highest SNR.

5. The method according to claim 4, wherein:
the channel simulator is further configured to produce and save simulation results in pre-simulated files based on the propagation model, and
the method further includes:
saving power values of the signals output by the plurality of controllable attenuators into receive signal power files; and
comparing the pre-simulated files and the receive signal power files for validating emulation.

6. The method according to claim 4, wherein:
the propagation model includes Jake's fading model.

7. The method according to claim 4, wherein:
for different propagation models, the channel simulator generates different output control files to control the plurality of controllable attenuators.

8. The method according to claim 4, wherein estimating, by the processor, the SNRs of the signals output by the plurality of controllable attenuators to identify the channel with the highest SNR includes:
estimating, by the processor, the SNRs of the signals output by the plurality of controllable attenuators using a M2M4 SNR estimation algorithm; and
identifying the channel with a highest estimated SNR.

* * * * *